Figure 1:
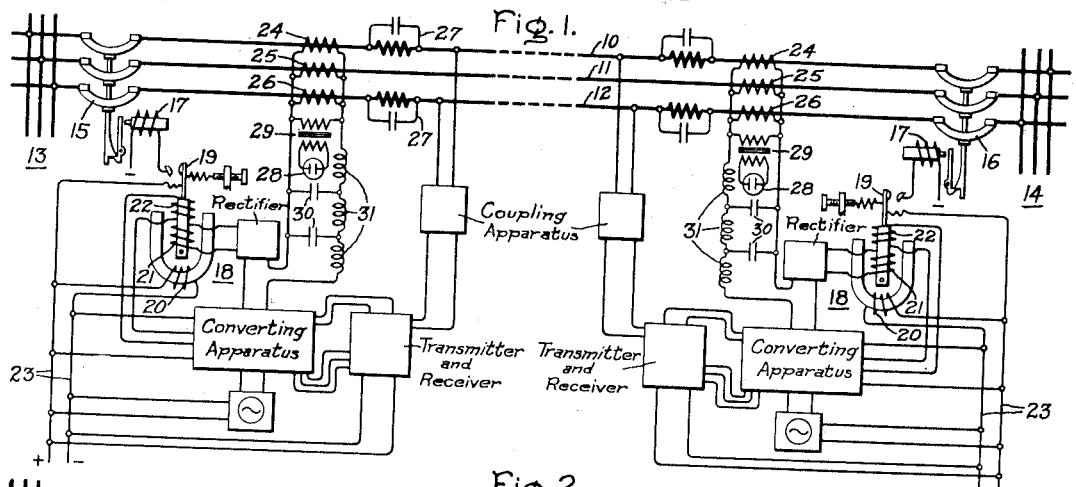

May 1, 1934.  A. S. FITZ GERALD  1,957,204

FAULT RESPONSIVE APPARATUS

Filed July 13, 1931

Inventor:
Alan S. FitzGerald,
by Charles E. Tullar
His Attorney.

Patented May 1, 1934

1,957,204

UNITED STATES PATENT OFFICE 1,957,204

FAULT RESPONSIVE APPARATUS

Alan S. Fitz Gerald, Wynnewood, Pa., assignor to General Electric Company, a corporation of New York Application July 13, 1931, Serial No. 550,299

14 Claims. (Cl. 175—294)

My invention relates to improvements in fault responsive apparatus for electric circuits and more particularly to improvements in fault responsive apparatus of the type disclosed in United States Letters Patent 1,797,976, issued March 24, 1931, wherein through the use of currents whose frequency differs from that of the circuit current, discriminating action is obtained by comparison of electric characteristics of the circuit at different points thereof so that, on the occurrence of abnormal circuit conditions, faulty circuit portions can be isolated without impairing continuity of service on the remainder of the circuit.

As disclosed in the patent mentioned, an oscillation transmitter, located at one point of the circuit to be protected, is operative to transmit a wave of a given frequency only during alternate half cycles of the circuit current at this point. A receiver tuned to the frequency of this wave is located at another point of the circuit and is operative to receive only during alternate half cycles of the circuit current at this other point. Normally and on faults external to the section between the two points, the circuit currents at both points are substantially in phase but in case of an internal fault are approximately 180° out of phase. When the phase relation of current at the two points indicates that the fault is not between the points, the transmitter and receiver are simultaneously operated and the circuit is not opened. When the phase relation of current at the two points indicates a fault between the points, the transmitter and receiver are not simultaneously operative and a circuit interrupter under the control of the receiver is opened.

The transmitter and receiver are energized in accordance with the phase and magnitude of the circuit current. The extent of their energization is consequently dependent upon the severity of the fault and therefore variable. While, in some cases, the excitation currents may be sufficiently great, in others they may not be such as to permit a satisfactory sensitivity of response or to insure the operation of the receiver where it is a considerable distance from the transmitter as in long high voltage lines with the consequently great attenuation of the transmitted oscillation. In cases where the excitation current is derived from parallel connected transformers, the available excitation current is decreased by reason of the fact that the fault loaded transformer has to supply exciting current to the other transformers.

One object of my invention is then to provide an improved fault responsive apparatus in which the control of the energization or excitation for the proper operation of either the transmitter or the receiver or both is dependent on the phase of the fault current but the amount of the energization is independent of the magnitude of this current whereby to insure the desired certainty and sensitivity of response without the necessity for special or expensive current transformers, independent high voltage sources and high transformer burden and without regard to the nature of the transformer connections required for the faults against which protection is desired. This and other objects of my invention will appear in more detail hereinafter.

My invention will be better understood from the following description when considered in connection with the accompanying drawing and its scope will be pointed out in the appended claims.

Figure 2:
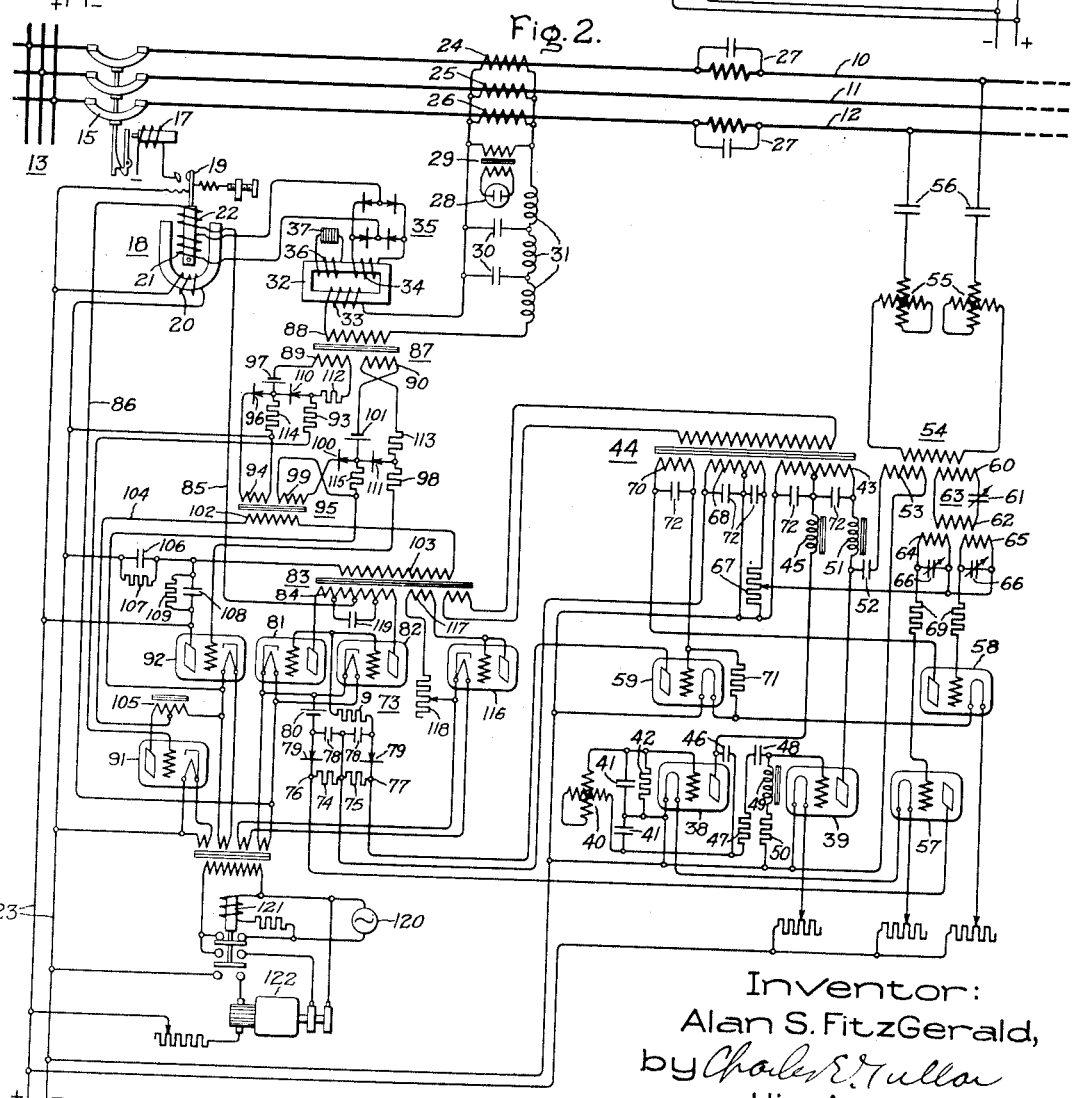

In the accompanying drawing, Fig. 1 illustrates diagrammatically and schematically fault responsive apparatus embodying my invention as applied to the protection of a section of an electric circuit, and Fig. 2 illustrates diagrammatically fault responsive apparatus embodying my invention for one point of an electric circuit.

I have shown in Fig. 1 for the purpose of illustrating my invention, an embodiment thereof as applied to a section of a polyphase circuit 10, 11, 12, for protection against abnormal conditions such for example as ground faults. The section is shown as extending between two points such as stations or busses 13, 14, from which, and the rest of the system, the section can be isolated by suitable circuit interrupting means illustrated as latch-closed circuit breakers 15 and 16, each having a trip coil 17.

For controlling the circuit breaker at each station, I provide a tripping relay 18, an oscillation transmitter and a receiver, the receiver at each station being tuned to the frequency of the transmitter at the other station.

As shown, the tripping relay 18 is of the polarized type disclosed in United States Letters Patent 1,541,618, issued June 9, 1925. For suitably controlling its movable contact member 19, the relay 18 is provided with a polarizing winding 20, an operating winding 21 and a restraining winding 22. The polarizing winding 20 is connected to be energized from a suitable direct current source 23, such as the station storage battery. The operating winding 21 is connected to be energized by a substantially continuous current dependent on the circuit current, residual current as illustrated, at the relay location through suitable means such as parallel connected current transformers 24, 25, 26, and a rectifier. The restraining winding 22 is connected to be energized by a substantially continuous current under the control of the receiver in the station where the relay is located. Since under normal conditions the operating and restraining windings are not energized, it is preferable to have the movable contact member 19 biased to the open circuit position, as shown, in order to prevent contact closure under jars, shocks and vibrations. The resilient biasing means shown may be adjustable to provide for variation in pick-up or sensitivity.

While any suitable channel of transmission may be employed for the transmitted oscillations, I have shown the transmitters and receivers connected to two of the circuit conductors 10 and 12 through suitable coupling apparatus intermediate trap circuits 27 which confine the transmitted oscillations to the circuit section to be protected. The transmitters and receivers may be controlled in accordance with the instantaneous direction of the circuit current where they are located as disclosed in United States Letters Patent 1,797,976 but, in accordance with my present invention, the amount of the energization of the transmitters at least, and the receivers also if desired, is independent of the magnitude of the circuit current. For this purpose, I provide, in accordance with my invention, suitable converting apparatus which is capable of furnishing from the comparatively low voltage station battery 23 an alternating current output whose magnitude is sufficient to provide the necessary signal strength and whose phase and frequency correspond to the phase and frequency of the circuit current.

The operation of this converting apparatus is controlled by the fault current but the output is independent of variations in the fault current, which merely has to be above a predetermined minimum value. This value is very low but is nevertheless sufficient to initiate and maintain the operation of the apparatus so as to produce whatever extent of energization of the transmitter and receiver is desired independently of the severity of the fault.

In order to protect all equipment which is connected to the parallel connected secondaries of the current transformers 24, 25, 26, from dangerous high voltage excitation, the circuit of these transformers may be shunted by a suitable voltage regulating means, such as a glow tube 28. This may be connected in the secondary circuit of a voltage step-up transformer 29 whose primary is connected across the secondary circuit of the current transformers.

Inasmuch as switching transients may result in unbalanced charging currents of high frequency which tend to cause operation the same as a residual or ground fault current, there may be provided in the circuit of the current transformer secondaries suitable filter means, such as condensers 30 and inductance coils 31 in order to avoid any possibility of false operation of the converting apparatus.

The transmitters and receivers are operative on alternate half cycles of the circuit current, residual current as illustrated, at their respective locations. The transmitters may operate alternately or simultaneously and also the receivers but in order to reduce the number of frequencies required, each transmitter may operate at the same frequency. In this case the transmitters and receivers are so arranged that when the transmitters are transmitting simultaneously, neither receiver can receive but when the transmitters are transmitting alternately, the receiver at either station can receive only from the transmitter at the other station. Thus, for a ground fault outside the circuit section between stations 13 and 14, the operating winding 21 of each tripping relay 18 is energized, thereby tending to cause contact closing operation thereof, but the transmitters transmit alternately when the instantaneous direction of the ground fault current is substantially the same at both receiver locations. Consequently, both receivers receive. The restraining winding 22 of each tripping relay which is controled by the associated receiver, therefore, is energized from the source 23 and neither of the circuit breakers 15, 16 is tripped. For a ground fault on the section between stations 13 and 14, the transmitters transmit simultaneously since the instantaneous direction of the ground fault current at one transmitter location differs by approximately 180° from that of the ground fault current at the other transmitter location. Consequently, neither receiver receives and the restraining winding 22 of each tripping relay remains deenergized. The operating winding 21, however, being energized by the ground fault current, effects the contact closing operation and both circuit breakers 15 and 16 are tripped to isolate the section.

In order more clearly to understand the apparatus at each station, reference is now had to Fig. 2 which illustrates in detail one way of carrying out the embodiment of my invention schematically shown in Fig. 1. While this illustrates only the apparatus at station 13, it is of course to be understood that similar apparatus will be installed at the other station.

As shown, the rectifier for the excitation of the operating winding 21 of the relay 18 includes a transformer 32 which has its primary winding 33 connected in the circuit of the parallel connected secondaries of the current transformers 24, 25, 26. In the circuit of the secondary winding 34, there is connected a full-wave rectifier 35 which may be of the contact type. Since fault currents have a wide range in intensity, the transformer 32 may be provided with a voltage limiting means such as an auxiliary secondary 36 across which is connected a resistance 37 of a material having a negative ampere characteristic in order to prevent damage from excessive voltages. Such a resistance material is disclosed in United States Letters Patent 1,822,742, issued September 8, 1931. At low voltages the resistance 37 passes little, if any, current but with increasing voltage, the current increases much more rapidly than the voltage, thus, in effect, short-circuiting the winding 36 and thereby limiting the voltage applied to the rectifier.

The transmitter may be of the thermionic electric discharge valve type and is shown as including two valves 38, 39, which are respectively a master oscillator valve and a power amplifying valve. The control electrode or grid circuit of the oscillator valve 38 includes a tuning inductance 40, tuning condensers 41 and a leak resistance 42. The anode circuit includes a part of the secondary 43 of an anode voltage supply transformer 44, a choke 45 and a blocking condenser 46. The grid circuit of the amplifying valve 39 includes a coupling resistance 47, a coupling condenser 48, a choke 49 and a leak resistance 50. The anode circuit of the amplifying valve 39 includes the whole of the secondary winding 43 and a choke 51. The transmitter output circuit includes a blocking condenser 52 and the winding 53 of a coupling transformer 54, which is, in turn, coupled through inductances 55 and condensers 56 to the channel of transmission. As illustrated, this includes the two phase conductors 10 and 12, although any suitable conducting medium or space transmission of the transmitted wave may be utilized.

The receiving apparatus illustrated is of the differential type disclosed in the copending application of Maurice E. Bivens, Serial No. 489,758, filed October 20, 1930. The receiver proper is shown as of the thermionic electric discharge valve type and includes means for producing two similar electric quantities which are dependent on the phase relation of current, ground fault current in the case illustrated, at the points where the transmitter and its cooperating receiver are located. The receiver is, in effect, two receivers, one a direct receiver which includes a control detector such as the biased detector valve 57 and the other a compensating receiver which includes a compensating detector such as the biased detector valve 58 and a cooperating compensating control valve 59 which normally has no bias.

The control electrodes of the detector tubes 57 and 58 are coupled to the transmission circuit through a tuned link circuit which includes the winding 60 of the coupling transformer 54, a tuning condenser 61 and a primary winding 62 of an impedance matching transformer 63. The secondary windings 64 and 65 of this transformer are shunted by tuning condensers 66 and are connected to a control electrode biasing resistor 67 which is connected across a part of the secondary winding 68 of the transformer 44. Each control electrode circuit may include a current limiting resistor 69. The output of the detector valve 58 is used to control the operation of the compensating control valve 59. For this purpose the anode circuit of the valve 58 includes, besides its excitation source, the transformer winding 70, a control electrode biasing resistance 71 and the control electrode of the valve 59. The plate and grid excitations of the detector valves 57 and 58 are such that these valves are simultaneously conducting. The valve 58, however, through its anode circuit applies a negative grid bias to the compensating control valve 59, thus blocking this valve while valves 57 and 58 are conducting. Valve 59 is consequently conducting, provided the biasing voltage is zero, whenever its anode voltage derived from the transformer 44 is positive. The secondary windings of the transformer 44 may be provided with by-pass condensers 72 to keep out high frequency currents.

For controlling the tripping relay 18, the outputs of the direct and compensating receivers are applied differentially to the restraining winding 22 of the relay 18, through suitable means such as a full wave electric discharge valve rectifier 73. This rectifier includes voltage drop producing means, such as resistances 74, 75, which are connected in the anode circuits of the valves 57, 59 respectively, so that the resultant voltage drop across the two resistors in series, that is across the terminals 76, 77, of the resistors, is proportional to the difference between the average values of the anode circuit currents of these valves. Thus the anode circuit of the valve 57 includes the resistance 74 while the anode circuit of the valve 59 includes the resistance 75, both circuits being energized from a part of the winding 68 of the supply transformer 44. Across each of the resistances 74, 75, there is connected a filter condenser 78 in series with a one-way valve 79, which may be a contact rectifier, as shown. In case a contact rectifier is used, a leak resistance will not ordinarily be required across it, since it will substantially act as such for current in the reverse direction. As voltages appear across one of the condensers 78 or the other, depending on which of the valves 57, 59 is conducting, the negative bias from the battery 80 on the control electrodes of the space discharge valves 81, 82 is overcome. The circuit of the control electrodes includes a current limiting resistance 9. These valves, which may be of the arc-discharge type in order to obtain a relatively high output, supply the restraining winding 22, which is connected in their anode circuits, with a substantially continuous current derived from the output transformer 83 of the converting apparatus mentioned in connection with Fig. 1. The anodes of the valves 81 and 82 are connected to the outside terminals of the secondary winding 84 of the transformer 83. The midpoint of this winding is connected to one end of the restraining winding 22 by a conductor 85. The other end of the winding 22 is connected to the cathodes of the valves 81 and 82 by a conductor 86.

The converting apparatus, mentioned in connection with Fig. 1 for providing a predetermined energization of the transmitter or the receiver, or both, in accordance with the phase of the current, but independently of the magnitude thereof is illustrated as of the so-called series condenser inverter type disclosed in United States Letters Patent 1,752,247, issued March 25, 1930. Also, as illustrated the inverter includes an excitation lock-out feature of the type disclosed in the copending application of Maurice E. Bivens, Serial No. 507,748, filed January 9, 1931, so that only one of the space discharge valves can be conductive at a time. Such inverters are operable from a relatively low voltage continuous current source, for example the station battery 23 which may be about 125 volts, to provide an alternating current of a desired frequency and phase relation corresponding to some alternating current control source of excitation and of a power and voltage sufficient to insure the proper operation of the transmitter or the receiver, or both, independently of the magnitude of the control current or voltage, if such control excitation is sufficient to render the valves conducting.

The converting apparatus includes a control transformer 87 which is connected to be energized in accordance with the circuit current. In the illustrated example, the primary 88 of this transformer is connected in circuit with the parallel connected secondaries of the current transformers 24, 25, 26, so as to be energized in accordance with the residual current of the circuit 10, 11, 12, for response to ground faults. In order to reduce the phase shift between the exciting current, that is the residual current of the circuit and the alternating current output of the inverter, the control transformer 87 is so constructed and arranged as to saturate at a comparatively low value of current, for example the lowest value of current at which operation is desired. Thus, through the secondary windings 89, 90, alternating control voltage is applied to the control electrodes or grids of two electric discharge valves 91, 92, which may be of the arc-discharge type wherein the starting of current in the valve is determined by the potential on its control electrode but the stopping of the current is effected only by reducing the anode potential below the critical value. In order to reduce the excitation, necessary to start the inverter, to a minimum, these valves may also have a negative grid potential characteristic, that is, current may be started in the valve by reducing the negative grid potential to some small value. The grid circuit of the discharge valve 91 includes the transformer winding 89, a current limiting resistance 93, the secondary winding 94 of the lock-out transformer 95, a one-way valve 96 and a negative biasing battery 97. The grid circuit of the discharge valve 92 includes the transformer winding 90, a current limiting resistance 98, the secondary winding 99 of the lock-out transformer 95, a one-way valve 100 and a negative biasing battery 101. In order to insure that the negative lock-out voltages are in phase with the inverter output currents regardless of the power factor of the inverter load, the primary 102 of the lock-out transformer 95 is preferably a current winding connected in series with the primary 103 of the output transformer 83. A conductor 104 connects the winding 102 to the midpoint of a commutating reactor 105.

In order to obtain greater input and consequently output for a given size condenser, the inverter may have two charging circuits as illustrated. One of these circuits, starting from the positive side of the source 23, includes the anode of the valve 92, the right half of the reactor 105, the conductor 104, the lock-out transformer primary 102, the output transformer primary 103, a condenser 106 which may be shunted by a relatively high resistance 107 to the negative side of the source 23. The other charging circuit, starting from the positive side of the source 23, includes a condenser 108 which may be shunted by a resistance 109, the output transformer primary 103, the lock-out transformer primary 102, the conductor 104, the left half of the reactor 105, and the anode of the valve 91 to the negative side of the source 23. Thus, while one of the condensers 106, 108, is being charged, through one of the valves 92, 91, respectively which are alternately conducting, the other condenser is discharging through the same valve. The simultaneous charging and discharging currents are in the same direction through the output transformer primary 103 but the direction of the current therein of course depends upon which valve is conducting. The constants of the charging and discharging circuits should of course be such as to provide substantial resonance at the frequency of the control voltage, in this case the frequency of the power current in the circuit 10, 11, 12. In view of the desirability of furnishing sufficient lockout voltage to the excitation circuit on the occurrence of the first half cycle of inverter operation in order to insure high speed operation of the fault responsive apparatus, the full voltage of the source 23 should normally be applied to the anode of one of the valves 91, 92, with zero voltage across the other instead of having half voltage normally applied to the anode of each valve. For this purpose, therefore, one of the leak resistances 107, 109 should be omitted.

A one-way valve 110 is connected across the control transformer secondary 89 and the associated biasing battery 97. Similarly, a one-way valve 111 is connected across the control transformer secondary 90 and the biasing battery 101. These one-way valves, in effect, short-circuit the positive half cycles of alternating voltage and insure that only a negative voltage will be applied to the grids of the valves 91, 92, from the control transformer 87. Resistances 112, 113, may be included in the circuit of the transformer windings 89, 90 respectively to limit the current during the half cycles in which the devices 110, 111 are conducting.

Now, if, as a result of a ground fault, a wave of alternating voltage is supplied to the control transformer 87, the electric valves 91, 92, are alternately rendered conductive. The condenser 106 becomes charged from the source 23 and the condenser 108 discharged while the valve 91 is conducting and vice-versa while the valve 92 is conducting. Consequently, an alternating current is delivered to the output transformer 83 as is well understood by those skilled in the art. The one-way valves 110, 111 prevent a positive voltage from being supplied to the grids of the discharge valves 91, 92, but since these valves have negative grid voltage characteristics, they will be conductive during the respective positive half-cycles of grid voltage when their grid voltages are substantially zero. If, because of a transient or other cause, the polarity of the grid voltage applied to the transformer 87 should be reversed while the valve 91 is conducting, the negative voltage applied to the grid of the valve 92 would be zero. This valve would become conductive and the source 23 would be, in effect, short-circuited through the valves 91, 92, and the reactor 105. This is prevented by the lock-out transformer 95 whose primary 102 is connected in series with the primary 103 of the output transformer 83, and, therefore, is responsive to the direction of the current in the primary 103. The direction of the current in this winding 103 is, of course, dependent on which of the valves 91, 92, is conducting. The grid circuit of each of the valves 91, 92, however, includes a voltage derived from the lock-out transformer 95 which is so connected that a negative voltage is impressed on the grid of one valve whenever the other valve is conducting. Now, if the grid potential reverses polarity while the valve 91 is conducting, the secondary 90 of the transformer 87 tends to impress a positive potential on the grid of the valve 92, but as the one-way valve 111 is so connected as to pass current under this condition substantially all the voltage is used in the resistance 113. Consequently, the voltage impressed on the grid of the valve 92 from the winding 90 will be substantially zero. Simultaneously the direction of the current flowing in the valve 91 is such as to energize the lock-out transformer 95 to impress through its secondary 99 a negative voltage on the grid of the valve 92 thereby preventing this valve from becoming conductive as long as the valve 91 is conducting current. By analogy, the operation, if the valve 92 were initially conducting, will be obvious. In order to prevent the secondaries 94, 99, of the lock-out transformer from impressing positive voltages on the grids of the valves 91, 92. which would interfere with the normal operation of the apparatus, the one-way valves 96, 100 respectively are connected in series with these windings to prevent current flow in the biasing resistances 114, 115, during the positive half-cycles induced in secondaries 94, 99. In other words, the resistances 114, 115, are connected across the secondaries 94, 99, respectively and their associated one-way valves 96, 100 respectively in order that the secondary grid exciting circuits may not interfere with the main grid exciting circuits under normal operation. When the inverter is in operation, its output does not vary with the magnitude of the fault current. Consequently, the signal transmitted from one station is of an assured definite strength for the purpose required, that is actuating the receiver at the other station.

The high frequency current load consists of an appreciable transmitter load on one half cycle of the line current and a receiver or practically no load on the other half cycle. Variation in load impedance tends to affect the inverter output and the load unbalance on alternate half cycles is also reflected in the output wave form. In order to avoid this and have an approximately uniform load on the receiver, a balancing load, such as a dummy rectifier load, may be provided on the receiver half cycle. As shown, this balancing load includes an arc discharge valve 116 which receives its anode and grid excitations from the output transformer secondary 117 and which works into a load 118 of suitable impedance. This load may be adjusted approximately equivalent to the transmitter load.

In order to improve the wave form and absorb harmonics introduced by any lack of symmetry in the transmitter and balancing loads, the inverter may be given a capacitance load. This is represented in Fig. 2 by a load condenser 119 which is connected across a part of the output transformer secondary 84 and tunes the load circuit.

The cathodes of the transmitter and receiver electric discharge valves are preferably continuously excited for the sake of high speed operation. The required current being comparatively small may be taken directly from the station battery 23. The current drain of the cathodes of the arc discharge valves 81, 82, 91, 92, and 116 in the type of valve now preferred is, however, comparatively heavy. These valves may accordingly be excited from the station alternating current source 120. However, as this source may fail in time of emergency, it is desirable to provide a substitute. This may be done, as shown, by means of an under-voltage relay 121 which is connected across the source 120 and which, on failure of this source, drops out and starts up a motor generator set 122, energized from the station battery 23.

Under normal conditions, that is, no ground fault on the system of which the circuit section between stations 13 and 14 forms a part, the control transformer 87 is not energized. Consequently, the inverter and its associated transmitter and receiver remain inactive.

Assuming a ground fault on the system outside the section between stations 13 and 14, then the control transformer 87 at each station is energized and the inverter and its associated transmitter and receiver set into operation. The inverter now supplies its associated transmitter and receiver, an alternating current in phase with the ground fault current but of a magnitude independent of the magnitude of the ground fault current. Since the instantaneous direction of the ground fault current is substantially the same at each station, the transmitters at the two stations transmit alternately and the receivers also receive alternately but the receiver at one station receives when the transmitter at the other station transmits, all as set forth in United States Letters Patent 1,797,976, previously mentioned. At each station, the receiver output which is really the difference between the values of the outputs of the direct and compensating receivers as averaged by the rectifier 73 is supplied to the restraining winding 22 of the tripping relay 18 to overcome the effect of the operating winding 21, which is energized by the ground fault current, whereby to prevent closing of the contacts 19. In this way, tripping of the circuit breakers 15 and 16 is prevented.

If, however, the ground fault occurs on the section between the stations 13 and 14 and power is fed to the fault from both ends, then the instantaneous direction of the ground fault current at the two points is no longer the same since the ground fault currents at the two points differ in phase relation by approximately 180°. Under these conditions both transmitters transmit simultaneously and both receivers receive simultaneously, but on the half cycle when the transmitters are idle. Consequently, the receiver at neither station is energized and no current is fed to the restraining winding 22 of the tripping relay 18 at either station. The ground fault current supplied to the operating winding 21, therefore, energizes the movable member 19 of the relay 18 to close its contacts and thereby effect the tripping of the associated circuit breaker. In this way the circuit breaker at each end of the section is tripped and the faulty section isolated from the rest of the system. In case power is supplied to the fault from only one end of the section, the circuit breaker at that end will nevertheless be tripped, the action being substantially as just described for the apparatus at the end to which power is supplied. The circuit breaker at the other end will not be tripped because there is no ground fault current to energize the operating winding of the relay 21 at this end. This is, however, immaterial if power cannot flow from this end into the fault.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. In combination, an alternating current electric circuit, oscillation devices including a transmitter at one point of the circuit, a receiver at another point tuned to said transmitter, means for controlling the operation of said devices in accordance with the instantaneous direction of the circuit current at the respective points and means for effecting a predetermined energization of one of said devices, the amount of said energization being independent of the magnitude of the circuit current.

2. In combination, an alternating current electric circuit, an oscillation transmitter at one point of the circuit, a receiver at another point tuned to said transmitter, means for controlling the operation of said transmitter and receiver in accordance with the instantaneous direction of the circuit current at the respective points and means for effecting a predetermined energization of said transmitter, the amount of said energization being independent of the magnitude of the circuit current.

3. In combination, an alternating current electric circuit, an oscillation transmitter at one point of the circuit, a receiver at another point tuned to said transmitter, means for controlling the operation of said receiver in accordance with the instantaneous direction of the circuit current at said other point, and means for controlling the operation of said transmitter in accordance with the instantaneous direction of the circuit current at said one point including an inverter at said one point and means for controlling said inverter in accordance with the phase of the current at said one point.

4. In combination, an alternating current electric circuit, an oscillation transmitter at one point of the circuit, a receiver at another point tuned to said transmitter and means for controlling the operation of said transmitter, and receiver, in accordance with the instantaneous direction of the circuit current at the respective points including an inverter at each point and means for controlling said inverters in accordance with the phase of the circuit current at the respective points.

5. In combination, an alternating current electric circuit, means for interrupting said circuit and means for controlling said interrupting means including an oscillation transmitter at one point of the circuit, a receiver at another point tuned to said transmitter and means for controlling the operation of said transmitter in accordance with the instantaneous direction of the circuit current at said one point including an electric valve inverter and means for controlling said inverter in accordance with the phase of the circuit current at said one point.

6. In a protective arrangement for an alternating current electric circuit an inverter, means for controlling said inverter in accordance with the phase and frequency of a voltage derived from the circuit, a transmitter and a receiver connected to be energized alternately from said inverter in accordance with the instantaneous direction of the circuit current, said transmitter and receiver constituting relatively unequal loads on said inverter, load balancing means for maintaining an approximately uniform load on said inverter and means controlled by said receiver for interrupting said circuit.

7. In combination, an alternating current electric circuit, means for interrupting said circuit, means for controlling said interrupting means including an oscillation transmitter at one point of the circuit, a receiver at another point tuned to said transmitter and means for controlling the operation of said transmitter in accordance with the instantaneous direction of the circuit current at said one point including converting apparatus, means for energizing said converting apparatus independently of the circuit and means for controlling said apparatus in accordance with the phase of the circuit current at said one point.

8. In combination, an alternating current electric circuit, an oscillation transmitter at one point of the circuit, a receiver at another point tuned to said transmitter, means for controlling the operation of said receiver in accordance with the instantaneous direction of the circuit current at said other point and means for controlling the operation of said transmitter in accordance with the instantaneous direction of the circuit current at said one point including converting apparatus, a continuous current source for energizing said converting apparatus and controlling means for causing said converter to furnish an alternating current output whose phase is substantially the same as the phase of the circuit current at said one point.

9. A protective arrangement for an electric circuit including an oscillation transmitter at each of two points of the circuit, means for energizing said transmitters so as to transmit alternately when the circuit currents at the two points are substantially in phase and simultaneously when the circuit currents at the two points are substantially out of phase including an inverter at each point and means for controlling each inverter in accordance with the phase of the circuit current at the point, a receiver at each of said points, the receiver at each point being tuned to the frequency of the transmitter at the other point and being controlled by the circuit current at the point so as to receive from the transmitter at the other point only when the transmitters are transmitting alternately and means controlled by said receivers for interrupting said circuit.

10. In a protective arrangement for an electric power system an inverter, means for controlling said inverter in accordance with a voltage derived from the system, two devices connected to be energized from said inverter individually at different times, said devices constituting relatively unequal loads on the inverter, load balancing means for maintaining an approximately uniform load on said inverter and circuit interrupting means controlled by one of said devices.

11. In a protective arrangement for an electric circuit inverting means, means for effecting the operation of said inverting means only on the occurrence of a predetermined abnormal condition of the circuit and means for controlling the circuit connected to said inverting means for energization substantially independent of the magnitude of the circuit condition.

12. In a protective arrangement for an alternating current circuit inverting means, means for effecting the operation of said inverting means in accordance with the phase and frequency of a voltage derived from the circuit on the occurrence of a fault on the circuit and means for interrupting said circuit including means connected to be energized from said inverting means.

13. In a protective arrangement for an electric circuit means for converting a direct current into an alternating current, a source of direct current energization for said converting means, means operative on the occurrence of a fault on the circuit for controlling the operation of said converting means in accordance with a condition of the circuit and means for controlling said circuit connected to the alternating current side of said converting means for energization substantially independent of the effect of said circuit condition on the magnitude of an electric quantity of the circuit.

14. In a protective arrangement for an alternating current circuit a normally inactive inverting means, means for controlling said inverting means in accordance with the phase and frequency of an electric quantity of the circuit on the occurrence of a fault on the circuit and means for interrupting said circuit including means connected to said inverting means for energization substantially independent of the magnitude of said electric quantity.

ALAN S. FITZ GERALD.